(12) United States Patent
Jia et al.

(10) Patent No.: US 9,971,316 B2
(45) Date of Patent: May 15, 2018

(54) PROCESS VARIABLE TRANSMITTER WITH DUAL COMPARTMENT HOUSING

(71) Applicant: Rosemont Inc., Chanhassen, MN (US)

(72) Inventors: Jinjie Jia, Beijing (CN); Dirk Bauschke, Shakopee, MN (US); Kirsten Norman, Chanhassen, MN (US); Todd Larson, Shakopee, MN (US)

(73) Assignee: Rosemount Inc., Chanhassen, MN (US)

( * ) Notice: Subject to any disclaimer, the term of this patent is extended or adjusted under 35 U.S.C. 154(b) by 459 days.

(21) Appl. No.: 14/237,476

(22) PCT Filed: Sep. 30, 2013

(86) PCT No.: PCT/CN2013/084662
§ 371 (c)(1),
(2) Date: Feb. 6, 2014

(87) PCT Pub. No.: WO2015/042929
PCT Pub. Date: Apr. 2, 2015

(65) Prior Publication Data
US 2015/0094826 A1   Apr. 2, 2015

(51) Int. Cl.
*G05B 13/02*   (2006.01)
*G01D 11/24*   (2006.01)

(52) U.S. Cl.
CPC ........... *G05B 13/02* (2013.01); *G01D 11/245* (2013.01)

(58) Field of Classification Search
None
See application file for complete search history.

(56) References Cited

U.S. PATENT DOCUMENTS

| 3,247,719 A | 4/1966 | Chelner |
| 4,623,266 A | 11/1986 | Kielb |

(Continued)

FOREIGN PATENT DOCUMENTS

| CN | 2170506 Y | 6/1994 |
| CN | 20167398 Y | 6/1994 |

(Continued)

OTHER PUBLICATIONS

Notification of Transmittal of the International Search Report and the Written Opinion of the International Searching Authority from corresponding PCT/CN2013/084662, dated Jun. 30, 2014.

(Continued)

*Primary Examiner* — Wissam Rashid
(74) *Attorney, Agent, or Firm* — Westman, Champlin & Koehler, P.A.

(57) ABSTRACT

A process variable transmitter for use in an industrial control or monitoring process is provided and includes a housing with a cavity formed therein which extends between first and second housing openings. The transmitter further includes a process variable sensor configured to sense a process variable of the industrial process. An electronics carrier assembly is mounted in the cavity and is configured to define a first compartment and a second compartment in the cavity and provide a seal therebetween. Measurement circuitry is carried by the electronics carrier assembly in the first compartment and configured to receive a process variable signal and provide an output. An electrical connection is carried on the electronics carrier assembly in the second compartment and is electrically coupled to the output of the measurement circuitry.

20 Claims, 6 Drawing Sheets

(56) References Cited

U.S. PATENT DOCUMENTS

| | | | |
|---|---|---|---|
| 4,958,938 A | 9/1990 | Schwartz | 374/208 |
| 5,302,934 A | 4/1994 | Hart et al. | 338/22 |
| 5,353,200 A | 10/1994 | Bodin et al. | |
| 5,451,939 A | 9/1995 | Price | 340/870.31 |
| 5,483,743 A * | 1/1996 | Armogan | B29C 70/72 29/883 |
| 5,498,079 A | 3/1996 | Price | |
| 5,546,804 A * | 8/1996 | Johnson | G01D 11/245 191/26 |
| 5,606,513 A | 2/1997 | Louwagie | 364/510 |
| 5,656,782 A * | 8/1997 | Powell, II | G01L 19/14 73/756 |
| 5,665,899 A | 9/1997 | Willcox | 73/1.63 |
| 5,727,110 A | 3/1998 | Smith et al. | |
| 5,753,797 A | 5/1998 | Forster et al. | |
| 5,938,619 A * | 8/1999 | Dogre Cuevas | A61B 5/0008 374/141 |
| 5,954,526 A | 9/1999 | Smith | 439/136 |
| 6,062,095 A | 5/2000 | Mulrooney et al. | 73/866.5 |
| 6,146,188 A | 11/2000 | Snyder | |
| 6,356,191 B1 | 3/2002 | Kirkpatrick et al. | |
| 6,484,107 B1 | 11/2002 | Roper et al. | 702/50 |
| 6,546,805 B2 | 4/2003 | Fandrey et al. | 73/753 |
| 6,790,050 B1 | 9/2004 | Roth-Steielow et al. | |
| 7,164,262 B2 | 1/2007 | Zacay | 324/115 |
| 7,190,053 B2 | 3/2007 | Orth et al. | |
| 7,421,258 B2 | 9/2008 | Bauschke et al. | 455/128 |
| 7,550,826 B2 | 6/2009 | Orth et al. | |
| 7,984,652 B2 | 7/2011 | Hausler | 73/756 |
| 8,128,284 B2 | 3/2012 | Martensson | 374/208 |
| 8,217,782 B2 | 7/2012 | Nelson et al. | 340/539.1 |
| 8,223,478 B2 | 7/2012 | Perrault et al. | |
| 8,290,721 B2 | 10/2012 | Wehrs et al. | 702/45 |
| 8,334,788 B2 | 12/2012 | Hausler et al. | 340/870.02 |
| 8,408,787 B2 | 4/2013 | Rud et al. | |
| 8,736,784 B2 | 5/2014 | Hausler et al. | 349/58 |
| 9,030,190 B2 | 5/2015 | Matt | 324/156 |
| 9,097,563 B2 | 8/2015 | Tanabe | |
| 9,479,201 B2 | 10/2016 | Larson et al. | |
| 2002/0011115 A1 | 1/2002 | Frick | |
| 2002/0069700 A1 | 6/2002 | Dirmeyer | 73/431 |
| 2002/0115333 A1 | 8/2002 | Self | 439/374 |
| 2004/0051521 A1 | 3/2004 | Ishihara | 324/207.16 |
| 2007/0191970 A1* | 8/2007 | Orth | G01D 18/008 700/17 |
| 2007/0201192 A1 | 8/2007 | McGuire et al. | 361/600 |
| 2009/0257722 A1 | 10/2009 | Fisher et al. | |
| 2011/0058313 A1* | 3/2011 | Hausler | G01D 11/245 361/679.01 |
| 2011/0215944 A1 | 9/2011 | Hausler et al. | |
| 2011/0317390 A1 | 12/2011 | Moser et al. | |
| 2012/0063065 A1 | 3/2012 | Perrault et al. | |
| 2012/0147608 A1 | 6/2012 | Kawagoe et al. | |
| 2013/0083824 A1 | 4/2013 | Bronczyk et al. | |
| 2013/0126519 A1 | 5/2013 | Arnal Valero et al. | |
| 2013/0344818 A1 | 12/2013 | McGuire et al. | 455/73 |
| 2014/0095095 A1 | 4/2014 | Rud et al. | 702/69 |
| 2014/0269829 A1 | 9/2014 | Bronczyk et al. | 374/152 |
| 2015/0280754 A1 | 10/2015 | Larson et al. | |
| 2016/0093997 A1 | 3/2016 | Eriksen et al. | |

FOREIGN PATENT DOCUMENTS

| | | |
|---|---|---|
| CN | 1155329 A | 7/1997 |
| CN | 1191602 | 8/1998 |
| CN | 1898534 A | 1/2007 |
| CN | 2857251 Y | 1/2007 |
| CN | 201204543 | 3/2009 |
| CN | 101776491 A | 7/2010 |
| CN | 102365528 | 2/2012 |
| CN | 102483366 | 5/2012 |
| CN | 202562633 U | 11/2012 |
| CN | 203053467 | 7/2013 |
| CN | 203148583 | 8/2013 |
| CN | 203 385 492 U | 1/2014 |
| CN | 204165564 | 2/2015 |
| CN | 204255566 | 4/2015 |
| DE | 10 2005 046 331 | 3/2007 |
| DE | 10 2010 090 924 | 12/2011 |
| EP | 1 897 365 | 10/2008 |
| EP | 2 772 729 A2 | 2/2014 |
| JP | 64-48625 | 3/1989 |
| JP | 4-505662 | 10/1992 |
| JP | H0660919 | 3/1994 |
| JP | H09-127066 | 5/1997 |
| JP | H-1167300 | 3/1999 |
| JP | 2000-509484 | 7/2000 |
| JP | 2008-514012 | 5/2008 |
| JP | 2011-146436 | 7/2011 |

OTHER PUBLICATIONS

Office Action from Chinese Application No. 201110443913.7, dated Mar. 26, 2014.
Communication Under Rules 161(1) and 126 EPC from European Application No. 12743559.2, dated Jul. 4, 2014.
Office Action from Chinese Application No. 201110443913.7, dated Nov. 4, 2014.
Notification of Transmittal of the International Search Report and the Written Opinion of the International Searching Authority for PCT/US2014/049710, dated Oct. 28, 2014.
Notification of Transmittal of the International Search Report and the Written Opinion of the International Searching Authority for PCT/US2014/043123, dated Nov. 20, 2014.
First Office Action from corresponding Chinese Patent Appln. No. 201120555381.1 dated Jun. 6, 2012. 3 pgs.
Product Data Sheet. Rosemount 644 Temperature Transmitter. Oct. 2010 by Emerson Process Management.28 pgs.
Bulletin IC50A0-E. Temperature Transmitters YTA Series. Yokogawa Electric Corporation. 8 pgs.
Product Data Sheet 3.80. TDZ&THZ Smart Hart® Temperature Transmitters. Apr. 2005 by Moore Industries. 16 pgs.
Notification of Transmittal of the International Search Report and the Written Opinion of the International Searching Authority for PCT/US2012/043705, dated Apr. 23, 2014.
Office Action from U.S. Appl. No. 13/251,726, dated Apr. 24, 2014.
Notification of Transmittal of the International Search Report and the Written Opinion of the International Searching Authority for PCT/US2015*014560, dated May 19, 2015.
Office Action from U.S. Appl. No. 14/225,775, dated Nov. 27, 2015.
Office Action from U.S. Appl. No. 14/225,775, dated Apr. 12, 2016.
Office Action from U.S. Appl. No. 14/035,019, dated Jun. 21, 2016.
EP Communication from European Patent Application No. 14737130.6, dated May 4, 2016.
Office Action from Chinese Patent Application No. 201410054296.5, dated May 5, 2016.
EP Communication from European Patent Application No. 138941460.4, dated May 9, 2016.
Office Action from U.S. Appl. No. 14/036,787, dated Mar. 23, 2016.
Communication pursuant to Rules 161(1) and 162 Application No. 14755740.9-1568, dated May 4, 2016, EPC for European Patent 2 pages.
Office Action from Chinese Patent Application No. 201410186900.X, dated Oct. 19, 2016.
Invitation to Pay Additional Fee from corresponding International Patent Application No. PCT/US12/043705 dated May 24, 2013. 9 pgs.
Rosemount "Rosemount 3144P Temperature Transmitter," Mar. 2008.
Office Action dated Mar. 29, 2013 in U.S. Appl. No. 13/251,726, filed Oct. 3, 2011. 13 pages.
Final Office Action dated Nov. 14, 2013 in U.S. Appl. No. 13/251,726, filed Oct. 3, 2011. 15 pgs.
Wika: "Digital Temperature Transmitter," Jul. 2008. 7 pgs.
Office Action from U.S. Appl. No. 14/035,019, dated Jan. 5, 2017.
Office Action from Canadian Patent Application No. 2,923,141, dated Dec. 12, 2016.

(56) References Cited

OTHER PUBLICATIONS

Notification of Transmittal of the International Search Report and the Written Opinion of the International Searching Authority from PCT/US2015/035421, dated Sep. 21, 2016.
Rosemount "Rosemount 3144P Temperature Transmitter," Nov. 2010.
Office Action from Chinese Patent Application No. 201410054296.5, dated Dec. 29, 2016.
Office Action from Japanese Patent Application No. 2016-518191, dated Mar. 8, 2017.
Communication from European Patent Application No. dated 13894160.4, Apr. 13, 2017.
Office Action from Russian Patent Application No. 2016116897, dated May 30, 2017.
Office Action from Japanese Patent Application No. 2016-54438, dated Apr. 19, 2017.
Office Action from Chinese Patent Application No. 201410054296.5, dated Jun. 20, 2017.
Office Action from U.S. Appl. No. 14/753,119, dated Jul. 10, 2017.
Office Action from U.S. Appl. No. 14/035,019, dated Jun. 15, 2017.
Office Action from Japanese Patent Application No. 2016-544318, dated Aug. 9, 2017, 6 pages.
Office Action from European Patent Application No. 14 737 130.6-1568, dated Jul. 9, 2017, 13 pages.
Rejection Decision from Chinese Patent Application No. 201410054296.5, dated Sep. 28, 2017, 23 pages.
Office Action from Japanese Patent Application No. 2016-518191, dated Nov. 29, 2017.

\* cited by examiner

PROCESS VARIABLE TRANSMITTER WITH DUAL COMPARTMENT HOUSING

CROSS-REFERENCE TO RELATED APPLICATION

This Application is a Section 371 National Stage Application of International Application No. PCT/CN2013/084662, filed Sep. 30, 2013, not yet published, the contents of which are hereby incorporated by reference in their entirety.

BACKGROUND

The present invention relates to industrial process control or monitoring systems. In particular, the present invention relates to process variable transmitters configured to sense process variables in such systems.

Process variable transmitters are used in industrial process control environments. Such transmitters couple to a process fluid to provide measurements related to the process. Process variable transmitters can be configured to monitor one or more process variables associated with fluids in a process plant, such as slurries, liquids, vapors and gasses in chemical, pulp, petroleum, gas, pharmaceutical, food and other fluid processing plants. Example monitored process variables include pressure, temperature, flow, level, pH, conductivity, turbidity, density, concentration, chemical composition or other properties of fluids. Typically, the process variable transmitters are located at remote locations, usually in a field, and send information to a centralized location such as a control room. Process variable transmitters sense process variables in a variety of applications, including oil and gas refineries, chemical storage tank farms, or chemical processing plants. In many instances, this requires the process variable transmitters to be located in a harsh environment.

Some types of process variable transmitters include a housing divided into two separate compartments. One compartment contains electrical circuitry and the other compartment contains a terminal block used to couple to a process control loop. One such configuration is shown in U.S. Pat. No. 5,546,804. As shown, that configuration includes a housing divided into two separate compartments.

SUMMARY

A process variable transmitter for use in an industrial control or monitoring process is provided and includes a housing with a cavity formed therein which extends between first and second housing openings. The transmitter further includes a process variable sensor configured to sense a process variable of the industrial process. An electronics carrier assembly is mounted in the cavity and is configured to define a first compartment and a second compartment in the cavity and provide a seal therebetween. Measurement circuitry is carried by the electronics carrier assembly in the first compartment and configured to receive a process variable signal and provide an output. An electrical connection is carried on the electronics carrier assembly in the second compartment and is electrically coupled to the output of the measurement circuitry.

DETAILED DESCRIPTION OF ILLUSTRATIVE EMBODIMENTS

The present invention provides a process variable transmitter for use in an industrial process, including a housing divided into two compartments. The two compartments are defined by an electronics carrier assembly which carries measurement circuitry and provides a seal between the two compartments.

Figure 1:
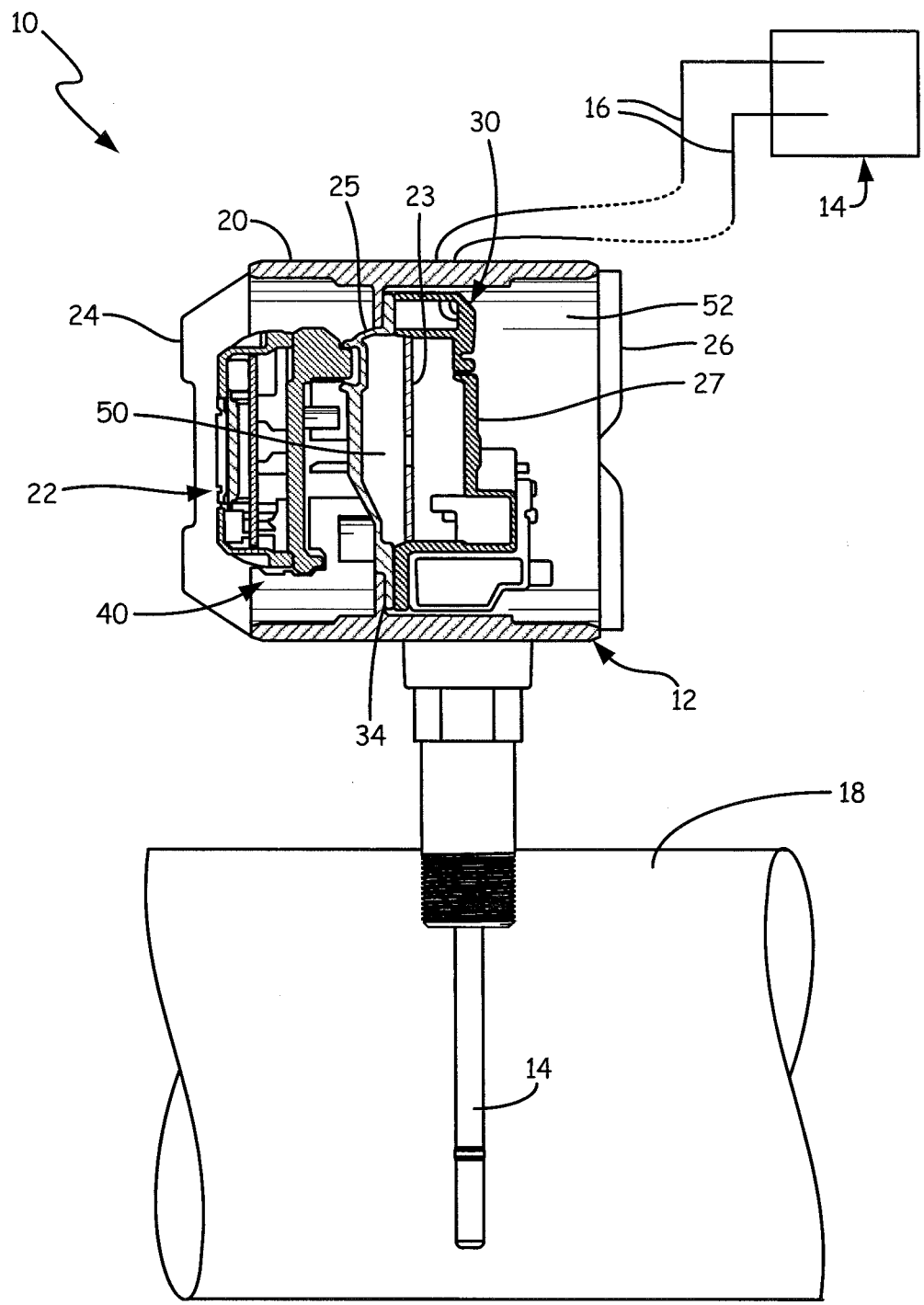
FIG. 1 is a diagram showing a cross-sectional view of a process variable transmitter including first and second cavities in accordance with one embodiment of the present invention.

FIG. 1 is a simplified diagram showing an industrial process control or monitoring system 10 for use in monitoring or controlling a process fluid in an industrial process. Typically, a process variable transmitter 12 is located at a remote location in a field, and transmits a sensed process variable back to a centrally-located control room 14. Various techniques can be used for transmitting the process variable, including both wired and wireless communications. One common wired communication technique uses what is known as a two-wire process control loop 16 in which a single pair of wires is used to both carry information as well as provide power to the transmitter 12. One technique for transmitting information is by controlling the current level through the process control loop 16 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless protocols, such as radio-frequency communication techniques including WirelessHART®, may also be implemented.

According to one embodiment, process variable transmitter 12 includes a probe 14 which extends into process piping 18 and is configured to measure a process variable of a process fluid in the process piping 18. Example process variables include pressure, temperature, flow, level, pH, conductivity, turbidity, density, concentration, chemical composition, etc. Process variable transmitter 12 includes a housing 20 having a cavity 40 formed therein, which extends between circular openings at opposed ends of housing 20 which are configured to receive end caps 24 and 26. End caps 24 and 26 are threadably coupled to the housing 20. In one embodiment, transmitter 12 includes display circuitry 22, which is sealed within the cavity 40 by end cap 24.

Single-compartment process variable transmitters are known. Such transmitters typically have an electronics module carried on a transmitter puck placed inside the housing which includes terminal connections. However, in a single compartment configuration, the interior electronics and other delicate components are exposed to the process environment when the cover is removed. Therefore, some prior art configurations use a dual compartment configuration in which the transmitter housing is divided into a first compartment and a second compartment by a bulkhead which is integrated with the housing and formed of a single piece with the housing.

As shown in FIG. 1, transmitter 12 includes an electronics carrier assembly 30 mounted in the cavity 40. In this embodiment, electronics carrier 30 includes a terminal cover 27 which defines a first compartment 50 and a second compartment 52 in the cavity 40 and provides a seal therebetween. Measurement circuitry 23 is carried in the electronics carrier assembly 30 in the first compartment 50. Measurement circuitry 23 is configured to receive a process variable signal from a process variable sensor and provide an output. Electrical connections (not shown in FIG. 1) are carried on the terminal cover 27 in second compartment 52 and can be used to, for example, couple to a process variable sensor such as temperature sensor carried in probe 14. The electrical connection is electrically coupled to the measurement circuitry 23 and provides a transmitter output on process control loop 16.

A seal is provided between a lip 34 of the electronics carrier assembly 30 and the housing 20 and seals the first compartment 50 from the second compartment 52. The seal can be formed using a sealing compound potted between the electronics carrier 30 and the housing 20 or can use other techniques. The sealing compound can be made out of a material suitable to provide the hermetic seal, such as, for example, rubber. In one embodiment, the seal includes against an O-ring, seated around the interior of housing 20. In a configuration with an O-ring, the seal can be secured in place between lip 34 of the electronics carrier 30 and the housing 20 using a securing mechanism such as screws or the like.

Figure 2:
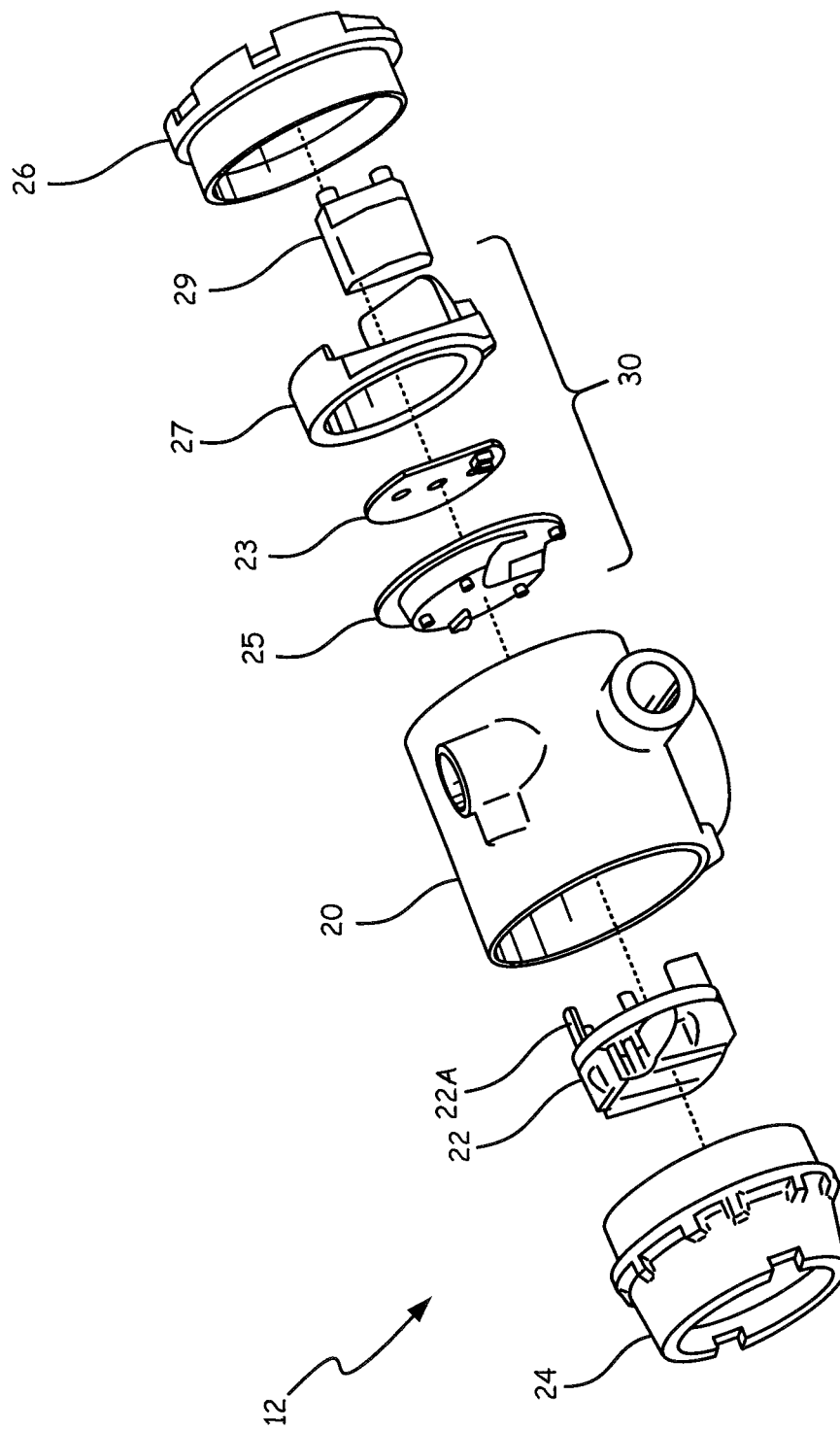
FIG. 2 is an exploded view of the process variable transmitter of FIG. 1.

FIG. 2 is an exploded view of one embodiment of process variable transmitter 12 illustrating housing 20, display 22, end caps 24 and 26 along with electronics carrier assembly 30. As illustrated in FIG. 2, electronics carrier assembly 30 includes measurement circuitry 23, a display interface cover 25 and a terminal cover 27. The terminal cover 27 provides a physical barrier between compartments 50 and 52. Measurement circuitry 23 is sandwiched between covers 25 and 27 and resides in first compartment 50. The display circuitry 22 can, for example, be configured to plug into display interface cover 25 shown in FIG. 2. For example, the components can include a multi pin connector to provide electrical communication therebetween and feet (22A shown in FIG. 2) can be received in terminal cover 25 to provide secure mounting. Alternative attachment techniques may be employed such as screws, adhesives, or the like. As explained below in more detail, carrier assembly 30 has a flanged configuration and forms a seal within housing 20 to divide a cavity within housing 20 into two separate compartments 50, 52. FIG. 2 also illustrates optional transient protection circuitry 29 which can be mounted to terminal cover 27. Circuitry 29 can, for example, prevent transients from the process control loop 16 or other connections from entering the measurement circuitry 23.

Figure 3:
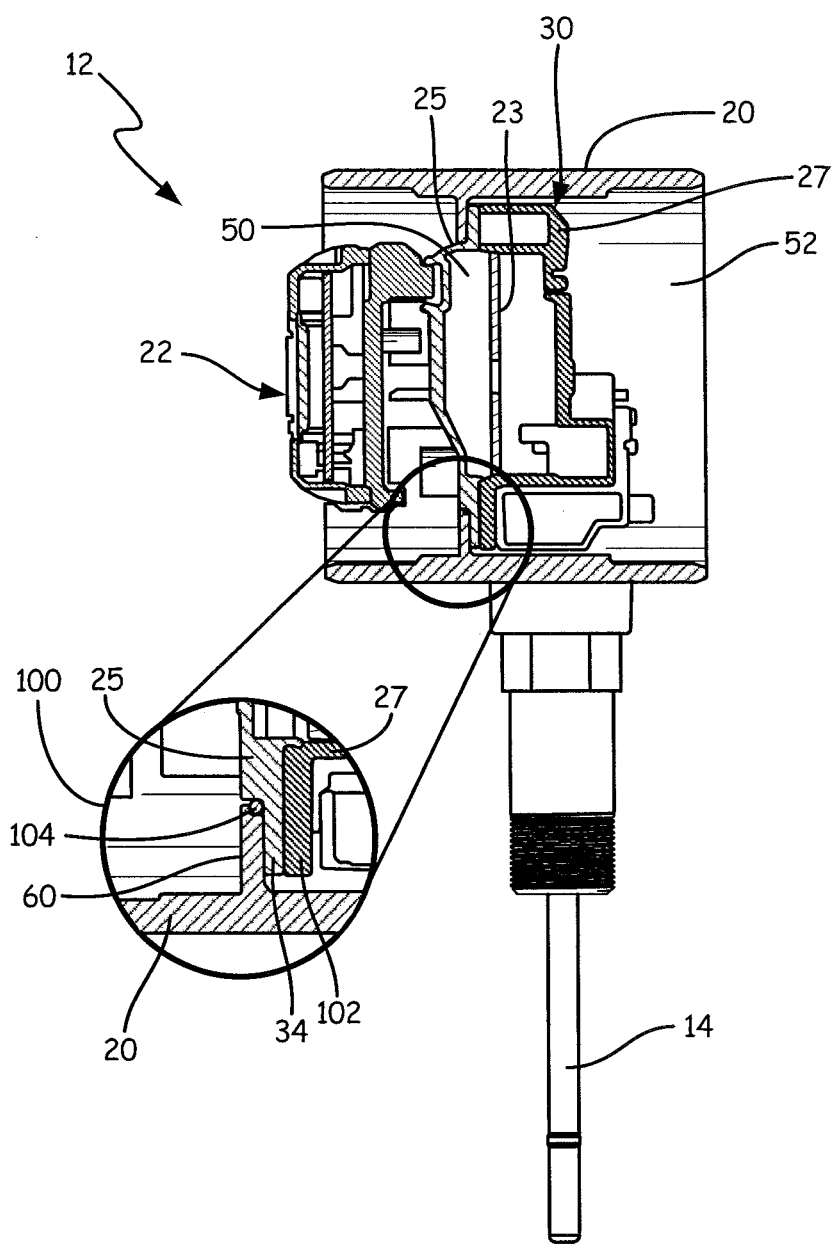
FIG. 3 is a diagram similar to FIG. 1 having an inset showing a seal in the transmitter housing of FIG. 1.
Figure 4:
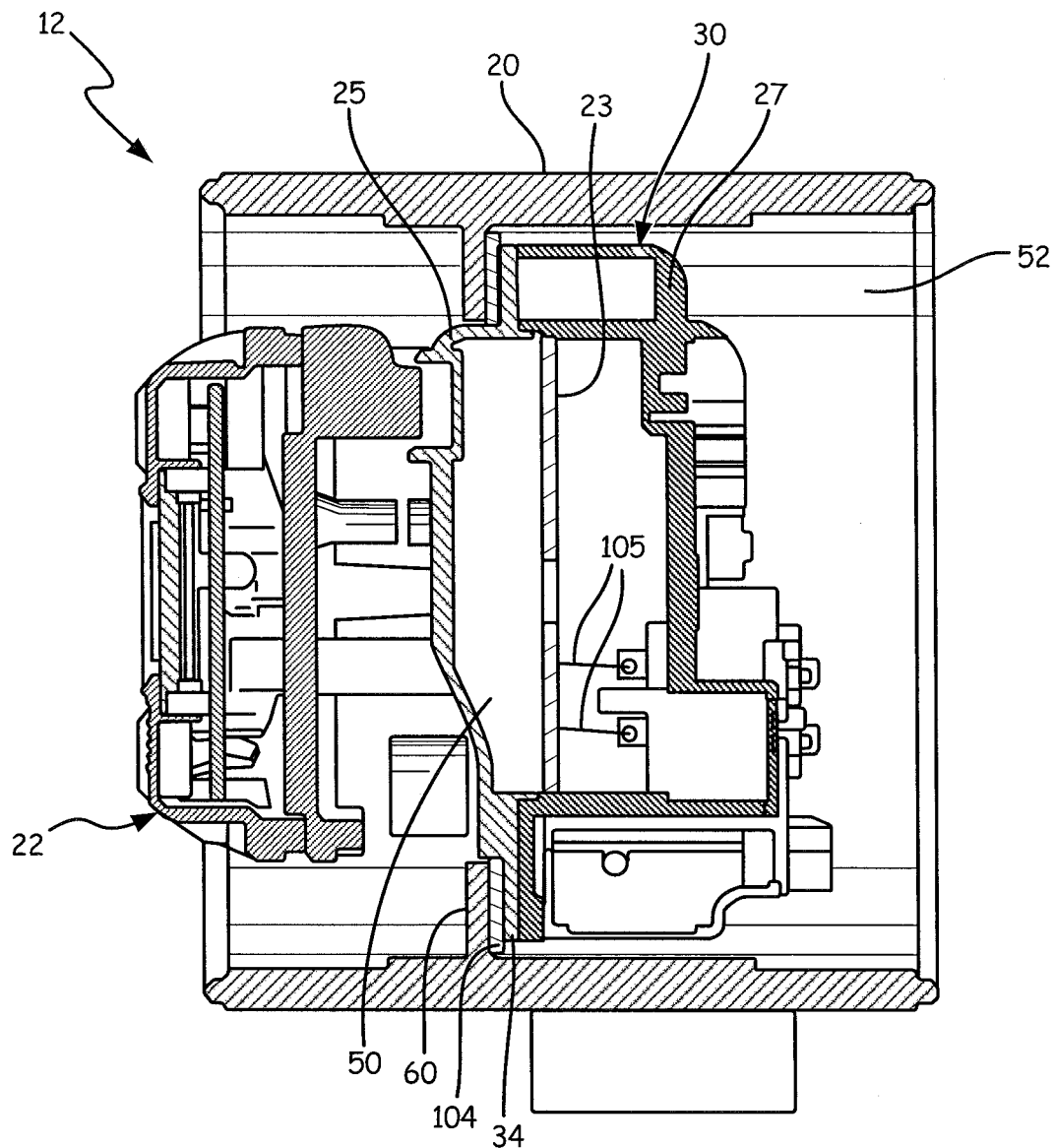
FIG. 4 is a cross-sectional view of the transmitter housing showing another example seal.

FIG. 3 shows transmitter 12 and includes an inset portion illustrated at 100 which better illustrates the seal formed between lip 34 of electronics carrier assembly 30 and lip 60 of housing 20. Lip 34 is pressed against housing lip 60 by carrier lip 102. Inset 100 also illustrates an O-ring gasket 104 positioned between lip 60 and lip 34. FIG. 4 is a cross-sectional view of another example embodiment of transmitter 12 using a gasket 104 shaped as a partial disc which is positioned between housing lip 60 and lip 34 of electronics carrier 30. Additionally, in FIG. 4, electrical connections 105 are shown which extend between terminals in second compartment 52 (illustrated in FIG. 5) and the measurement electronics 23.

Figure 5:
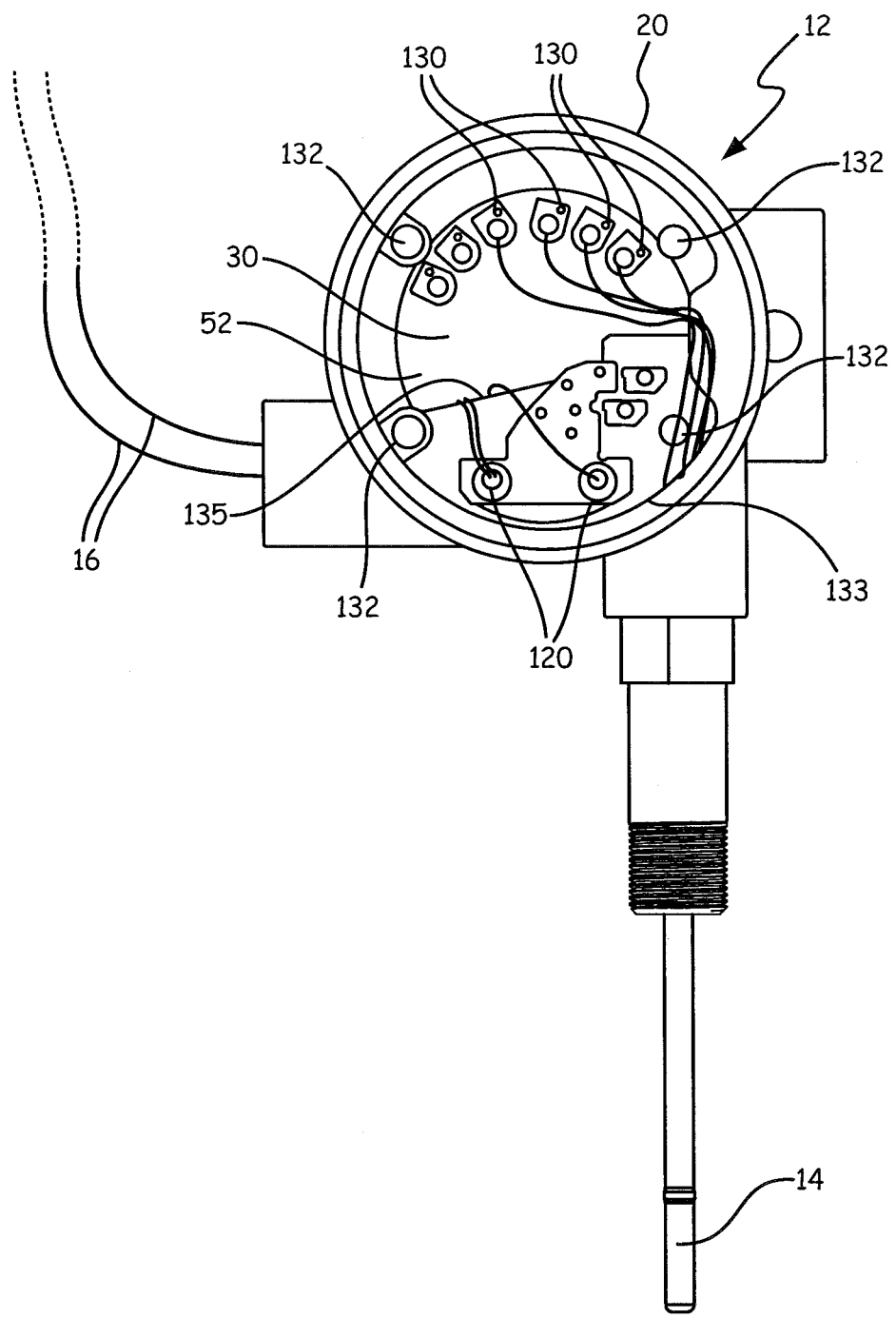
FIG. 5 is a front plan view of the transmitter of FIG. 1 showing terminal block connections.

FIG. 5 is a front plan view of transmitter 12 showing terminals 120 located in compartment 52. Terminals 120 are carried in compartment 52 on a terminal block side of electronics carrier assembly 30 and are configured to couple to process control loop 16. This terminal block side of electronics carrier assembly 30 also preferably carries sensor terminals 130 configured to couple to a process variable sensor 154 (not shown in FIG. 5) such as a temperature sensor carried on probe 14. In the configuration shown in FIG. 5, the terminal block side of carrier 30 can be accessed in compartment 52 by removing cover 26 without exposing measurement circuitry 23 or display circuitry 22 to the process environment. This allows an operator to access a sensor aperture 133 whereby wiring connected to probe 14 can be electrically connected to terminals 130 as well as a loop aperture 135 whereby connectors 120 can be coupled to process control loop 16. Apertures 133 and 135 are formed as openings through housing 20. FIG. 5 also illustrates screws 132 which are used to secure the electronics carrier assembly 30 in the housing 20. Screws 132 are used to apply a mounting force to the lips 60 and 102 and thereby provide a hermetic seal between compartments 50 and 52.

Figure 6:
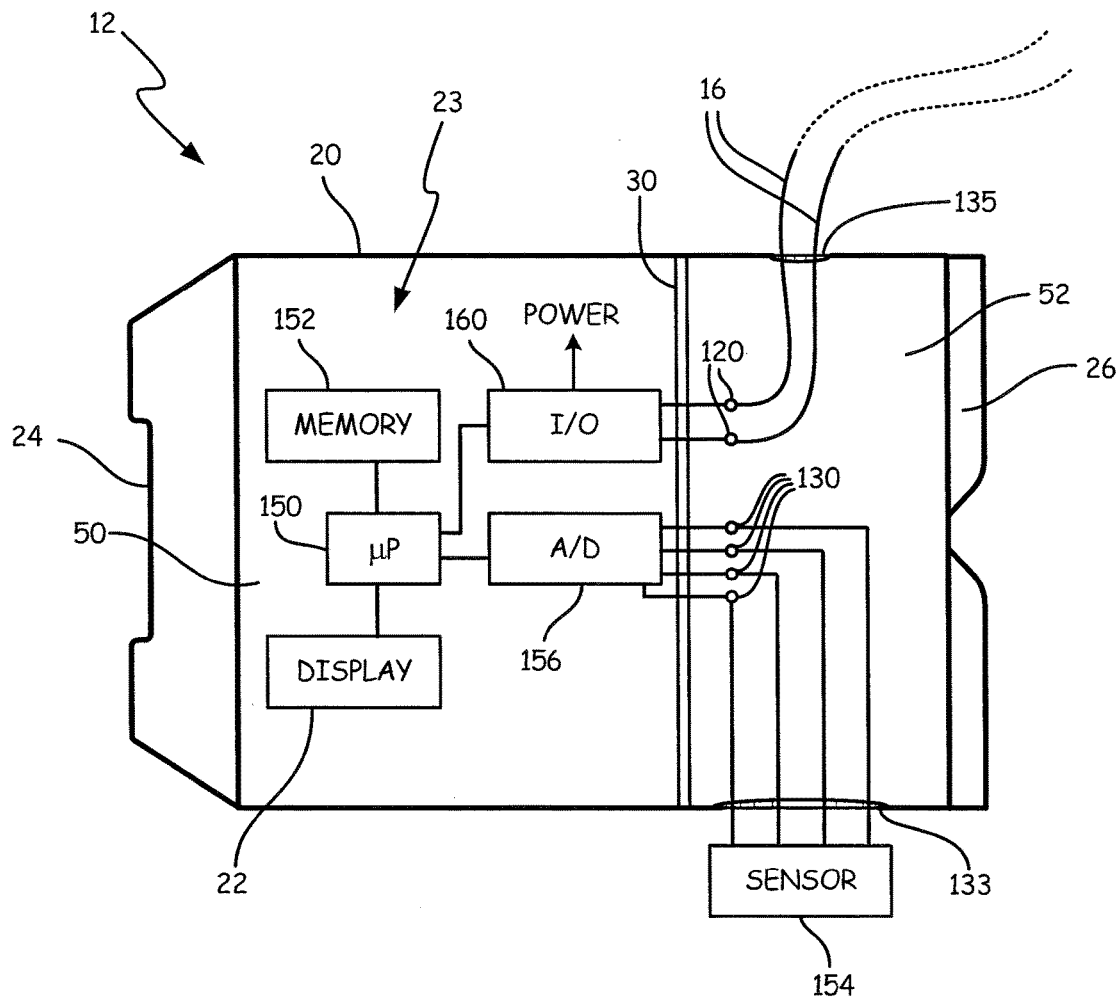
FIG. 6 is a simplified diagram showing electrical circuitry of the transmitter of FIG. 1.

FIG. 6 is a simplified block diagram of one example embodiment of process variable transmitter 12 showing measurement circuitry 23 in more detail. As illustrated in FIG. 6, measurement circuitry 23 is positioned in first compartment 50 and includes a microprocessor 150 which operates in accordance with instructions carried in a memory 152. Microprocessor 150 couples to a process variable sensor 154 through analog-to-digital converter 156 and sensor terminals 130 positioned in second compartment 52. Sensor 154 can be any type of process variable sensor including, for example, a temperature sensor. Microprocessor 150 couples to two-wire process control loop 16 through input/output circuitry 160 and terminals 120 positioned in compartment 50. I/O circuitry 160 is also configured to generate power for powering circuitry 22, 23 with power derived from two-wire process control loop 16.

As illustrated schematically in FIG. 6, the electronics carrier assembly 30 divides the transmitter housing 20 into cavities 50 and 52. Measurement circuitry 23 and optional display 22 are positioned in cavity 50 while terminals 120, 130 are positioned in cavity 52. As described above, end cap 26 can be removed from transmitter housing 20 whereby terminals 120, 130 and cavity 52 can be accessed by an operator. For example, this can be used to connect the transmitter 12 to the two-wire process control loop 16 through loop aperture as well as used to couple the measurement circuitry 23 to process variable sensor 154 through sensor aperture 133.

Although the present invention has been described with reference to preferred embodiments, workers skilled in the art will recognize that changes may be made in form and detail without departing from the spirit and scope of the invention. The electronics carrier can be fabricated of any appropriate material. In one specific embodiment, the electronics carrier is fabricated in plastic and the housing 20 and end caps 24, 26 are fabricated on metal, such as die cast aluminum. The measurement circuitry 23 may couple to an optional display 22. In such a configuration, the end cap 24 can be configured to include a transparent region whereby the display can be seen from outside of the transmitter housing 20. Although an O-ring, gasket and sealing compound have been described, any appropriate sealing technique may be used to seal the electronics carrier 30 to the inner wall of the housing 20. In the examples illustrated herein, a circumferential lip 102 of the electronics carrier 30 is urged against a circumferential lip 60 of the housing 20 to provide a seal therebetween. The seal prevents harsh environmental elements such as liquids, dust and dirt, etc., from reaching the electronic circuitry carried in compartment 50. The measurement circuitry 23 can be carried on a separate component or can be mounted directly with the electronics carrier. In one example, the connections which extend through carrier assembly 30 are formed by brass pins which are overmolded with plastic. This configuration does not require additional cold junction compensation when a thermocouple sensor is employed.

What is claimed is:

1. A process variable transmitter for use in an industrial process, comprising:
   a housing having a cavity formed therein which extends between first and second openings;
   a process variable sensor configured to sense a process variable of the industrial process;
   an electronics carrier assembly comprising an individual component from the housing, in abutting contact with the housing and mounted in the cavity configured to define a first compartment and a second compartment in the cavity, the electronics carrier assembly configured to carry electronics, the electronics carrier assembly including a first cover and a second cover with a cavity formed therebetween;
   a seal configured to seal the abutting contact between the electronics carrier assembly and the housing and thereby seal the first compartment from the second compartment;
   measurement circuitry carried in the cavity of the electronics carrier assembly and configured to receive a process variable signal from the process variable sensor and provide an output;
   an electrical connection carried on the electronics carrier assembly in the second compartment electrically coupled to the output of the measurement circuitry carried in the electronic carrier assembly, the electrical connection providing a transmitter output; and
   first and second end caps which seal the first and second openings, respectively, of the housing.

2. The process variable transmitter of claim 1, wherein the seal is formed between a lip on the electronics carrier assembly and a lip to the housing.

3. The process variable transmitter of claim 1, wherein the electronics carrier assembly comprises a plastic.

4. The process variable transmitter of claim 1, further including a sealing compound potted between the electronics carrier assembly and the housing.

5. The process variable transmitter of claim 1, further comprising an O-ring between the electronics carrier assembly and the housing.

6. The process variable transmitter of claim 1, further including a display connected to the measurement circuitry in the first compartment.

7. The process variable transmitter of claim 6, wherein the display plugs into the electronics carrier assembly.

8. The process variable transmitter of claim 1, including mounting screws configured to urge the electronics carrier assembly against the housing.

9. The process variable transmitter of claim 1, including a sensor connector carried on the electronics carrier assembly in the second compartment configured to electrically couple the measurement circuitry to the process variable sensor.

10. The process variable transmitter of claim 1, wherein the process variable sensor comprises a temperature sensor.

11. The process variable transmitter of claim 1, including a rubber gasket placed between the electronics carrier assembly and the housing and configured to provide a seal between the first compartment and the second compartment.

12. The process variable transmitter of claim 1, wherein the housing includes a sensor aperture accessible in the second compartment.

13. A method for use with a process variable transmitter in an industrial process, comprising:
   forming a cavity that extends between a first and a second opening of a housing;
   mounting an electronics carrier assembly in the cavity thereby defining a first compartment and a second compartment in the cavity, the electronics carrier assembly comprising an individual component from the housing and in abutting contact with the housing, the electronics carrier assembly configured to carry electronics, the electronics carrier assembly including a first cover and a second cover with a cavity formed therebetween;
   sealing the abutting contact between the electronic carrier assembly and the housing to thereby form a seal between the first compartment and the second compartment;
   sealing the first opening of the housing with a first end cap and the second opening of the housing with a second end cap;
   sensing a process variable of the industrial process using a process variable sensor;
   receiving the sensed process variable with connectors in the second compartment coupled to measurement circuitry in the cavity of the electronics carrier assembly; and
   providing a transmitter output using an electrical connection carried on the electronics carrier assembly in the second compartment which is electrically coupled to the measurement circuitry in the first compartment.

14. The method of claim 13, including placing a gasket between the electronics carrier assembly and the housing.

15. The method of claim 13, including plugging a display to the measurement circuitry.

16. The method of claim 14, including urging the electronics carrier assembly against the housing to form the seal.

17. The method of claim 14, including connecting the measurement circuitry to a process control loop using connectors on the electronics carrier assembly carried in the second compartment.

18. The method of claim 13, including connecting the measurement circuitry to the process variable sensor using connectors on the electronics carrier assembly carried in the second compartment.

19. A process variable transmitter for use in an industrial process, comprising:
   a housing having a cavity that extends between a first and a second opening thereof;
   electronics carrier means comprising an individual component from the housing and in abutting contact with the housing for defining a first compartment and a second compartment in the cavity, the electronics carrier means configured to carry electronics, the electronics carrier assembly including a first cover and a second cover with a cavity formed therebetween;

means for sealing the abutting contact between the electronics carrier means and the housing and thereby sealing the first compartment from the second compartment;
first end cap means for sealing the first opening of the housing and second end cap means for sealing the second opening of the housing;
means for sensing a process variable of the industrial process;
means for receiving the sensed process transmitter variable in the cavity of the electronics carrier assembly; and
means for providing the transmitter output using an electrical connection positioned in the second compartment and electrically coupled to the means for receiving.

20. The process variable transmitter of claim 19, including connector means connecting to a means for sensing, wherein the connector means is positioned in the second compartment.

* * * * *